United States Patent
Lankinen et al.

(10) Patent No.: US 9,858,522 B2
(45) Date of Patent: Jan. 2, 2018

(54) SECURITY DOCUMENT AND METHOD OF MANUFACTURING SECURITY DOCUMENT

(75) Inventors: Mikko Lankinen, Meudon (FR); Taru Syrjanen, Meudon (FR)

(73) Assignee: GEMALTO SA, Meudon (FR)

( * ) Notice: Subject to any disclaimer, the term of this patent is extended or adjusted under 35 U.S.C. 154(b) by 76 days.

(21) Appl. No.: 13/991,167

(22) PCT Filed: Nov. 29, 2011

(86) PCT No.: PCT/EP2011/071237
§ 371 (c)(1),
(2), (4) Date: Jun. 17, 2013

(87) PCT Pub. No.: WO2012/072610
PCT Pub. Date: Jun. 7, 2012

(65) Prior Publication Data
US 2014/0175176 A1  Jun. 26, 2014

(30) Foreign Application Priority Data
Dec. 2, 2010 (EP) ..................................... 10306339

(51) Int. Cl.
*G06K 19/07* (2006.01)
*B44C 1/17* (2006.01)
*G06K 19/077* (2006.01)

(52) U.S. Cl.
CPC ..... *G06K 19/07722* (2013.01); *G06K 19/077* (2013.01); *G06K 19/07728* (2013.01);
(Continued)

(58) Field of Classification Search
CPC ......... G06K 19/07749; G06K 19/0723; G06K 19/077; G06K 19/07722; G06K 19/07745;
(Continued)

(56) References Cited

U.S. PATENT DOCUMENTS 4,727,246 A * 2/1988 Hara ................ G06K 19/07745
174/544
4,792,843 A * 12/1988 Haghiri-Tehrani et al. .. 257/679
(Continued)

FOREIGN PATENT DOCUMENTS

DE 4317184 C1 * 7/1994 ............. H05K 3/305
EP 786357 * 7/1997
(Continued)

OTHER PUBLICATIONS

PCT/EP2011/071237 International Search Report, dated Mar. 19, 2012, European Patent Office, P.B. 5818 Patentlaan 2, NL—2280 HV Rijswijk.

*Primary Examiner* — Daniel Walsh
(74) *Attorney, Agent, or Firm* — The Jansson Firm; Pehr B. Jansson

(57) ABSTRACT

A security document (1, 1'), comprising: a base layer (10, 10') having a through hole (15, 15') extending from a first side of the base layer (10, 10') to a second side of the base layer (10, 10'); a first cover layer (11, 11') attached on the first side of the base layer (10, 10'); a second cover layer (12, 12') attached on the second side of the base layer (10, 10'); and an electronic module (4, 4') arranged in said through hole (15, 15'). The security document (1, 1') further comprises a first patch (21, 21') attached to the security document (1, 1') by hot stamping and located between the base layer (10, 10') and the first cover layer (11, 11'), the first patch (21, 21') surrounding the through hole (15, 15') and covering a perimeter area around the through hole (15, 15') on the first side of the base layer (10, 10'), thereby preventing attachment of the base layer (10, 10') to the first cover layer (11, 11') in the region of the perimeter area.

12 Claims, 1 Drawing Sheet

(52) U.S. Cl.
CPC ...... *G06K 19/07749* (2013.01); *B44C 1/1729* (2013.01); *Y10T 29/49155* (2015.01)

(58) Field of Classification Search
CPC ..... G07F 7/1008; G06Q 20/341; B32B 37/02; B32B 7/04; B32B 15/20; B32B 37/0076; B32B 37/06; B44C 1/1729
See application file for complete search history.

(56) References Cited

U.S. PATENT DOCUMENTS

| | | | | |
|---|---|---|---|---|
| 4,795,895 A * | 1/1989 | Hara | | G06K 19/07745 235/488 |
| 4,830,691 A * | 5/1989 | Kida | | H05K 3/4602 156/150 |
| 4,906,315 A * | 3/1990 | McGrew | | 156/231 |
| 5,026,452 A * | 6/1991 | Kodai | | G06K 19/07722 156/293 |
| 5,852,289 A * | 12/1998 | Masahiko | | G06K 19/07718 235/380 |
| 5,856,662 A * | 1/1999 | Kohama | | G06K 19/07703 235/488 |
| 5,926,696 A * | 7/1999 | Baxter | | H01L 23/24 257/700 |
| 6,036,797 A * | 3/2000 | Kanazawa et al. | | 156/82 |
| 6,232,652 B1 * | 5/2001 | Matsushima | | H01L 23/055 257/667 |
| 6,283,378 B1 * | 9/2001 | Welling | | 235/492 |
| 6,305,609 B1 * | 10/2001 | Melzer | | B32B 37/226 156/300 |
| 6,331,208 B1 * | 12/2001 | Nishida | | C30B 25/18 117/89 |
| 6,607,135 B1 * | 8/2003 | Hirai | | G06K 19/07718 235/487 |
| 6,644,551 B2 * | 11/2003 | Clayman et al. | | 235/488 |
| 6,765,286 B1 * | 7/2004 | Morimura et al. | | 257/684 |
| 6,885,291 B1 * | 4/2005 | Pollack | | B60C 23/0493 116/34 R |
| 7,116,231 B2 * | 10/2006 | Kayanakis | | B32B 37/02 235/487 |
| 7,377,446 B2 * | 5/2008 | Ohta et al. | | 235/492 |
| 8,519,905 B2 * | 8/2013 | Tanaka | | G06K 19/07749 343/866 |
| 8,608,080 B2 * | 12/2013 | Finn | | B32B 37/1207 235/487 |
| 9,435,856 B2 * | 9/2016 | Chen | | G01R 1/07378 |
| 2001/0055202 A1 * | 12/2001 | Templeton et al. | | 361/761 |
| 2002/0007906 A1 * | 1/2002 | Droz | | 156/269 |
| 2002/0020911 A1 * | 2/2002 | Lee et al. | | 257/700 |
| 2002/0144775 A1 * | 10/2002 | Tung | | H01L 23/10 156/303.1 |
| 2003/0038373 A1 * | 2/2003 | Cohn | | H01L 25/105 257/777 |
| 2003/0178495 A1 * | 9/2003 | Jones et al. | | 235/492 |
| 2003/0214794 A1 * | 11/2003 | Takahashi | | G06K 19/077 361/761 |
| 2004/0129788 A1 * | 7/2004 | Takahashi | | G06K 19/14 235/492 |
| 2004/0159709 A1 * | 8/2004 | Ohta | | G06K 19/077 235/492 |
| 2004/0169086 A1 * | 9/2004 | Ohta | | G06K 19/06046 235/492 |
| 2004/0189533 A1 * | 9/2004 | Yamanaka et al. | | 343/700 MS |
| 2005/0093172 A1 * | 5/2005 | Tsukahara | | G06K 19/07718 257/778 |
| 2005/0179122 A1 * | 8/2005 | Okawa | | G06K 19/07728 257/679 |
| 2006/0145867 A1 * | 7/2006 | Kikuchi et al. | | 340/572.8 |
| 2006/0192377 A1 * | 8/2006 | Bauer et al. | | 283/81 |
| 2006/0220219 A1 * | 10/2006 | Yang | | H05K 3/103 257/698 |
| 2008/0131669 A1 * | 6/2008 | Michalk | | B32B 27/12 428/196 |
| 2008/0179404 A1 * | 7/2008 | Finn | | G06K 19/07745 235/492 |
| 2008/0297283 A1 * | 12/2008 | Byun | | H01P 5/107 333/21 R |
| 2009/0101281 A1 * | 4/2009 | Sacherer | | 156/332 |
| 2009/0291271 A1 * | 11/2009 | Michalk | | B32B 3/18 428/195.1 |
| 2009/0315320 A1 * | 12/2009 | Finn | | B32B 37/1207 283/107 |
| 2011/0068270 A1 * | 3/2011 | Shin et al. | | 250/338.1 |
| 2011/0169146 A1 * | 7/2011 | Ohira | | G06K 19/07728 257/666 |
| 2011/0309899 A1 * | 12/2011 | Leiba | | H01P 3/121 333/208 |
| 2012/0050125 A1 * | 3/2012 | Leiba | | H01Q 1/2283 343/834 |
| 2012/0111949 A1 * | 5/2012 | Klaas et al. | | 235/488 |
| 2014/0175176 A1 * | 6/2014 | Lankinen | | G06K 19/077 235/488 |
| 2014/0197626 A1 * | 7/2014 | Le Loarer | | B42D 25/29 283/85 |
| 2014/0263663 A1 * | 9/2014 | Pueschner | | G06K 19/07745 235/492 |
| 2014/0306730 A1 * | 10/2014 | Chen | | G01R 31/2889 324/750.25 |
| 2015/0021403 A1 * | 1/2015 | Finn | | G06K 19/07747 235/492 |
| 2015/0227829 A1 * | 8/2015 | Finn | | G06K 19/07752 235/488 |

FOREIGN PATENT DOCUMENTS

| | | | | |
|---|---|---|---|---|
| JP | 01136792 A * | 5/1989 | | B42D 15/02 |
| JP | 01152098 A * | 6/1989 | | B42D 15/02 |
| JP | 2004046549 A * | 2/2004 | | |
| WO | WO2007061303 A1 | 5/2007 | | |
| WO | WO 2007089140 A1 * | 8/2007 | | G06K 19/077 |

* cited by examiner

SECURITY DOCUMENT AND METHOD OF MANUFACTURING SECURITY DOCUMENT

FIELD OF THE INVENTION

This invention relates to a security document such as an identity card or driving license, for instance.

BACKGROUND OF THE INVENTION

Security documents comprising an electronic module are known in the art. The electronic module is embedded into the material of the security document, in many cases in such a way that it can not be visually detected from a surface of the security document.

A problem with the above described prior art solution is that the material of the security document may crack in an area close to the electronic module. Such cracking is caused by internal stress in the material of the security document. One reason for the internal stress is that the material of the security document and the material of the electronic module have different thermal expansion coefficients, in other words, the amount of expansion and shrinkage is different when temperature changes occur.

BRIEF DESCRIPTION OF THE INVENTION

An object of the present invention is to solve the above mentioned problem and to provide a security document which has improved properties in order to avoid cracking. This object is achieved with a security document according to independent claim 1 and a method of manufacturing according to independent claim 9. The preferred embodiments of the invention are disclosed in the dependent claims.

The invention is based on the idea of hot stamping a patch between a base layer comprising an electronic module and a cover layer covering the base layer and the electronic module. The hot stamped patch is adapted to prevent the base layer and the cover layer from attaching to each other in a perimeter area around the electronic module.

An advantage of the invention is that internal stress and cracking of the security document can be avoided. Further, hot stamping method is free of solvents and other harmful substances.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
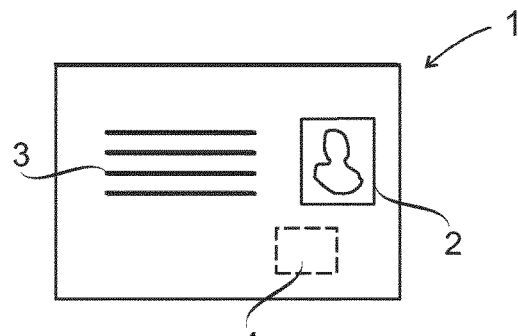
FIG. 1 shows a security document according to an embodiment of the invention.

FIG. 1 shows a security document 1 comprising a photograph 2 of the holder, written data 3 with information about the holder, and an electronic module 4, which is embedded into the material of the security document 1. In FIG. 1 the security document 1 is seen from a direction perpendicular to the plane of the security document 1.

Figure 2C:
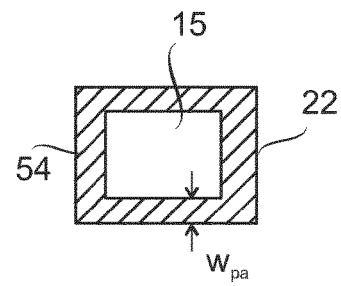
FIG. 2c shows a detail of the security document of FIG. 1.
Figure 2A:
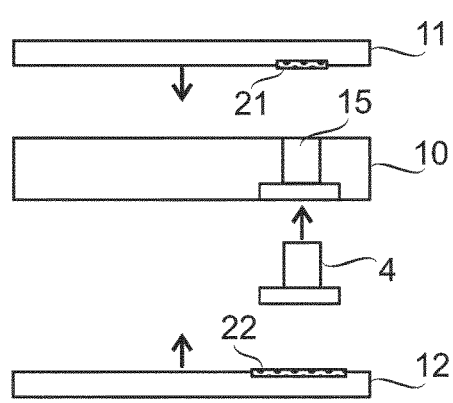
FIGS. 2a and 2b show a method for manufacturing the security document of FIG. 1.

FIG. 2a shows a base layer 10, an electronic module 4, a first cover layer 11 and a second cover layer 12 seen from a direction parallel to the plane of the security document 1. The base layer 10 includes a through hole 15 extending from a first side of the base layer 10 to a second side of the base layer 10. The electronic module 4 is inserted into the through hole 15. The size and form of the electronic module 4 substantially correspond to the size and form of the through hole 15. The first cover layer 11 has been positioned adjacent the first side of the base layer 10 and the second cover layer 12 has been positioned adjacent the second side of the base layer 10.

The first cover layer 11 comprises a first patch 21, which has been hot stamped on the side of the first cover layer 11 facing the first side of the base layer 10. The second cover layer 12 comprises a second patch 22, which has been hot stamped on the side of the second cover layer 12 facing the second side of the base layer 10. In the hot stamping process the first patch 21 has been transferred from a carrier film to the first cover layer 11 using a heated hot stamping die. The second patch 22 has been transferred from a carrier film to the second cover layer 12 in a similar way. Hot stamping is a known dry printing method so details of the hot stamping process are not discussed herein.

Figure 2B:
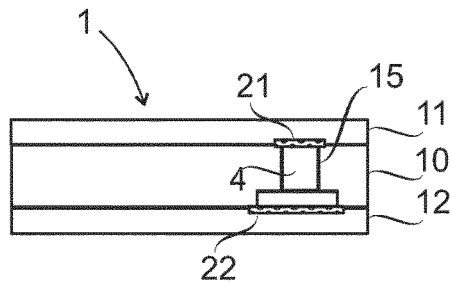

FIG. 2b shows a finished security document 1. The first cover layer 11 has been attached on the first side of the base layer 10, and the second cover layer 12 has been attached on the second side of the base layer 10. In an embodiment the base layer 10, the first cover layer 11 and the second cover layer 12 are laminated together. The electronic module 4 is interposed between the first cover layer 11 and the second cover layer 12. The first patch 21 is dimensioned and located such that it surrounds the through hole 15 and covers a perimeter area around the through hole 15 on the first side of the base layer 10, thereby preventing attachment of the first side of the base layer 10 to the first cover layer 11 at the perimeter area. The second patch 22 is dimensioned and located such that it surrounds the through hole 15 and covers a perimeter area around the through hole 15 on the second side of the base layer 10, thereby preventing attachment of the second side of the base layer 10 to the second cover layer 12 at the perimeter area.

FIG. 2c shows the through hole 15 and the second patch 22 from a direction perpendicular to the plane of the second patch 22. The area of the second patch 22 is larger than the area of the through hole 15, and the second patch 22 is located such that perimeter of the second patch 22 surrounds the through hole 15. A perimeter area around the through hole 15 is denoted with reference sign 54, and the width of the perimeter area is denoted with $w_{pa}$.

FIGS. 2a and 2b show that the area of the electronic module 4 is smaller on the first side of the base layer 10 than on the second side of the base layer 10. Also the area of the first patch 21 is smaller than the area of the second patch 22. In an alternative embodiment the areas of the first patch and the second patch are equal even though the area of the electronic module is smaller on the first side of the base layer than on the second side of the base layer. In said alternative embodiment width of the perimeter area is greater on the first side of the base layer than on the second side of the base layer.

The first patch 21 is a thin foil made of polymethylmethacrylate, which is a transparent thermoplastic material. Thickness of the first patch 21 may be 1 to 5 µm. In alternative embodiments polyethylene terephthalate (PET)

or other thermoplastic materials may be used. In further alternative embodiments the first patch may comprise a metal foil, such as an aluminium foil, a copper foil or a silver foil. It is also possible to combine above mentioned materials, for example by manufacturing the first patch from a laminate or composite comprising at least one thermoplastic foil and at least one metallic foil.

In alternative embodiments the thickness of the first patch may be much bigger than 5 µm. Technically it is quite possible to use a first patch having a thickness of 20 µm or even bigger. However, a thick first patch is visually detectable which in many cases is a negative feature.

The material and the thickness of the second patch 22 may be identical to the material and the thickness of the first patch 21. In an alternative embodiment the thickness of the second patch 22 may be different than the thickness of the first patch 21, and/or the material of the second patch 22 may be different than the material of the first patch 21.

Figure 3A:
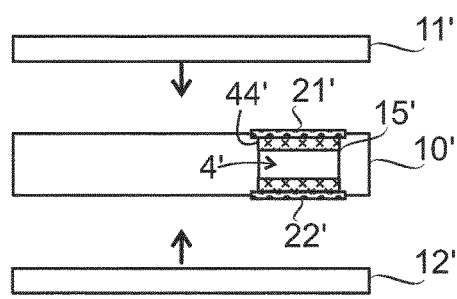
FIGS. 3a and 3b show another method for manufacturing a security document.
Figure 3B:
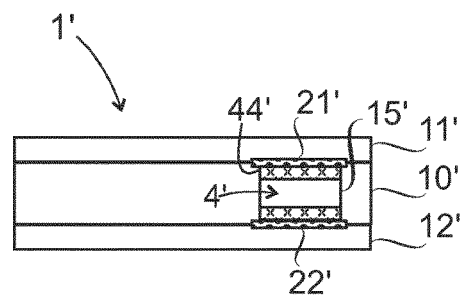

FIGS. 3a and 3b show an alternative method for manufacturing a security document. In this alternative method the patches are not hot stamped on the cover layers but on the base layer comprising the electronic module.

FIG. 3a shows a base layer 10', an electronic module 4', a first cover layer 11' and a second cover layer 12'. The base layer 10' includes a through hole 15' extending from a first side of the base layer 10' to a second side of the base layer 10'. The electronic module 4' has already been inserted into the through hole 15'. The size and form of the electronic module 4' substantially correspond to the size and form of the through hole 15'.

The base layer 10' comprises a first patch 21', which has been hot stamped on the side of the base layer 10' facing the first cover layer 11'. The base layer 10' also comprises a second patch 22', which has been hot stamped on the side of the base layer 10' facing the second cover layer 12'.

The electronic module 4' is located between the first patch 21' and the second patch 22'. The electronic module 4' comprises a protective layer 44' which extends both on a first side and a second side of the electronic module 4', the first side being the side facing the first cover layer 11' and the second side being the side facing the second cover layer 12'. The protective layer 44' has been provided on the electronic module 4' prior to inserting the electronic module 4' into the through hole 15'. Alternatively it is possible to provide the protective layer on the electronic module after the electronic module has been inserted into the through hole. The protective layer 44' is adapted to protect the electronic module 4' during the hot stamping process which is used to provide the first patch 21' and the second patch 22' on the base layer 10'. The protective layer 44' may comprise polycarbonate.

In an alternative embodiment the electronic module comprises a protective layer only on one side thereof. One-sided protective layer may be used for example when one side of the electronic module can withstand less heat and/or pressure than the other side of the electronic module.

A protective layer may be a layer whose area is substantially bigger than the area of the first patch. In an embodiment the area of the protective layer is the same as the area of the security document.

Expansion and shrinkage of an electronic module may cause some cracking in a protective layer in an area close to the electronic module. However, a patch between the protective layer and a cover layer prevents the cracking from advancing towards an outer surface of the security document.

FIG. 3b shows a finished security document 1'. The first cover layer 11' has been attached on the first side of the base layer 10', and the second cover layer 12' has been attached on the second side of the base layer 10'. The electronic module 4' is interposed between the first cover layer 11' and the second cover layer 12'. The first patch 21' is dimensioned and located such that it surrounds the through hole 15' and covers a perimeter area around the through hole 15' on the first side of the base layer 10', thereby preventing attachment of the first side of the base layer 10' to the first cover layer 11' at the perimeter area. The second patch 22' is dimensioned and located such that it surrounds the through hole 15' and covers a perimeter area around the through hole 15' on the second side of the base layer 10', thereby preventing attachment of the second side of the base layer 10' to the second cover layer 12' at the perimeter area.

The surface area of the electronic module 4' on the first side of the base layer 10' is equal to the surface area of the electronic module 4' on the second side of the base layer 10'. Accordingly the area of the first patch 21' is equal to the area of the second patch 22'.

In a further alternative embodiment a patch is hot stamped on a base layer containing an electronic module with no protective layer. Naturally this embodiment requires an electronic module which is sufficiently heat resistant and pressure proof.

Both the security document of FIG. 2b and the security document of FIG. 3b comprise a first patch on the first side of the base layer and a second patch on the second side of the base layer. Alternatively it is possible to provide a security document having a patch only on one side of the base layer.

It will be obvious to a person skilled in the art that the inventive concept can be implemented in various ways. The invention and its embodiments are not limited to the examples described above but may vary within the scope of the claims.

The invention claimed is:

1. A security document, comprising:
   a base layer having a through hole extending from a first side of the base layer to a second side of the base layer;
   a first cover layer attached on the first side of the base layer;
   a second cover layer attached on the second side of the base layer;
   an electronic module arranged in said through hole, a first patch attached by hot stamping on a side of the first cover layer facing the first side of the base layer, the first patch having an opening concentric with the through hole in the base layer, the first patch surrounding the through hole in a plane above the through hole, and covering a perimeter area adjacent to the through hole, and having a width greater than the through hole on the first side of the base layer and covering substantially less area than the base layer, thereby preventing the base layer from being directly attached to the first cover layer at an area defined by the perimeter area, said base layer being attached to the first cover layer in an area outside the perimeter; and
   a second patch attached to the security document by hot stamping and located between the base layer and the second cover layer, the second patch having an opening in a central portion thereof, the second patch surrounding the through hole and covering a perimeter area adjacent to the through hole and having a width greater than the through hole on the second side of the base layer and covering an area substantially less than the base layer, thereby preventing direct attachment of the base layer to the second cover layer in an area defined by the perimeter area and allowing attachment of the base layer to the second cover layer in an area outside of the perimeter area.

2. The security document according to claim 1, wherein the first patch is a thin foil having a thickness of 1 to 5 μm.

3. The security document according to claim 1 or 2, wherein the first patch comprises a foil made of thermoplastic material.

4. The security document according to claim 3, wherein the thermoplastic material is polymethylmethacrylate.

5. The security document as claimed in claim 1 or 2, wherein the first patch comprises an aluminium foil.

6. The security document according to claim 1 or 2, wherein the first patch comprises a plurality of foils laminated together.

7. The security document as claimed in claim 1 or 2, wherein there is a protective layer on the electronic module, the protective layer being adapted to protect the electronic module during a hot stamping process.

8. A method of manufacturing a security document, comprising:
- providing a base layer, a first cover layer, a second cover layer and an electronic module, the base layer having a through hole extending from a first side of the base layer to a second side of the base layer;
- arranging the electronic module in said through hole;
- attaching the base layer, the first cover layer and the second cover layer to each other such that the base layer is interposed between the first cover layer and the second cover layer;
- providing a first patch in a plane above the through hole and sized to form a width around a perimeter area adjacent to an opening in a central portion of the first patch and concentric with the through hole in the base layer, and having a width greater than the through hole on the first side of the base layer and substantially less area than the base layer;
- attaching the first patch on a side of the first cover layer facing the first side of the base layer by hot stamping such that in a finished security document the first patch surrounds the through hole, covers a perimeter area adjacent to the through hole on the first side of the base layer, thereby preventing a direct attachment of the base layer to the first cover layer in an area defined by the perimeter area and allowing direct attachment of the base layer to the first cover layer in an area outside of the perimeter; and
- providing a second patch attached to the security document by hot stamping and located between the base layer and the second cover layer, the second patch having an opening in a central portion thereof, the second patch surrounding the through hole and covering a perimeter area adjacent to the through hole and having a width greater than the through hole on the second side of the base layer and covering an area substantially less than the base layer, thereby preventing direct attachment of the base layer to the second cover layer in an area defined by the perimeter area and allowing attachment of the base layer to the second cover layer in an area outside of the perimeter area.

9. The method according to claim 8, wherein the first patch is hot stamped to the first cover layer before attaching the first cover layer to the base layer.

10. The method according to claim 8, wherein the method further comprises:
- providing a protective layer on the electronic module, the protective layer being adapted to protect the electronic module during a hot stamping process, and subsequently inserting the electronic module in the through hole;
- wherein the first patch is hot stamped to the base layer while the electronic module is in the through hole.

11. The method according to claim 10, wherein the protective layer comprises polycarbonate.

12. The method as claimed in any one of claims 8 to 11, wherein the base layer, the first cover layer, and the second cover layer comprise polycarbonate.

\* \* \* \* \*